Patented Mar. 21, 1950

2,500,919

UNITED STATES PATENT OFFICE 2,500,919

SODIUM-FREE FLAVORING COMPOSITIONS

Frank J. Cahn, Huntington Park, Calif., assignor to Louis Milani Foods, Inc., Maywood, Calif., a corporation of Illinois No Drawing. Application December 8, 1948, Serial No. 63,437

4 Claims. (Cl. 99—143)

This invention relates to a composition suitable for use as a seasoning and flavoring material, particularly in diets which must be substantially sodium-free. It is more specifically concerned with a composition that yields monopotassium glutamate in the presence of water.

Because the univalent ion $(C_5H_8NO_4)^-$ of glutamic acid possesses a decided meat-like taste, the monosodium salt of this acid has been widely used as a flavoring material. It is extensively employed where meat dishes are prohibited for religious reasons and in the tropics where the preservation of meat and meat extracts is difficult. It is also used to a considerable extent by restaurants and homemakers as an additive for gravies, soups, and the like. However, for physiological reasons, many people are limited to sodium-free diets. In such cases, of course, monosodium glutamate must be excluded from their food. In diets of this type, monopotassium glutamate would appear to be a suitable substitute for the corresponding sodium compound. However, considerable difficulty is encountered in the preparation of the monopotassium salt in a marketable form. Attempts to prepare this compound usually result in a product that is a syrupy liquid at room temperature, i. e., the compound is difficult to crystallize. Even when the compound is produced in crystalline form, it is found to possess undesirable storage properties since the crystals deliquesce in moist air. Glutamic acid cannot be used alone as a condiment because it is too acidic and sour. However, in accordance with the present invention, I have provided a dry sodium-free preparation that contains glutamic acid, and which, in the presence of water, yields monopotassium glutamate. In contrast to crystalline monopotassium glutamate, my composition is easy to prepare, is substantially noncaking, and remains free flowing even in air with a considerable moisture content.

It is an object of this invention to provide an edible product adapted for use as a seasoning and flavoring material.

It is another object of this invention to provide a substantially sodium-free powdered composition containing glutamic acid and a carbonate of potassium as a meat flavoring agent and as a substitute for sodium chloride.

In one embodiment my invention relates to a composition in dry form capable of yielding monopotassium glutamate in the presence of water, said composition comprising glutamic acid and a carbonate of potassium in an amount sufficient to supply substantially one atom of potassium for each molecule of said acid.

In a more specific embodiment my invention relates to a stable, substantially sodium-free flavoring preparation comprising glutamic acid in particle form and a carbonate of potassium in particle form, the amount of said carbonate being sufficient to provide approximately one atom of potassium for each two carboxyl hydrogen atoms of said acid.

In its primary aspect, my invention comprises a dry mixture of glutamic acid and either potassium carbonate ($K_2CO_3$) or potassium bicarbonate ($KHCO_3$). The ratio of carbonate to acid in the mixture is such that the acid is half neutralized when the mixture is contacted with water, i. e., the amount of carbonate should be such as to supply substantially one atom of potassium for each molecule of said acid. For example, for every 100.0 parts by weight of glutamic acid that are present in the mixture, 47.0 parts by weight of potassium carbonate or 68.0 parts by weight of potassium bicarbonate should be present. When such a mixture is contacted with water, the acid and the carbonate interact to form monopotassium glutamate. The mixture ordinarily is contacted with water, and thereby converted to monopotassium glutamate by adding it to aqueous food preparations such as soups, gravies, and the like. On the other hand, when my mixture is sprinkled on relatively dry foods, usually in place of salt in sodium-free diets, the interaction of the components generally is not completed until they are placed in the mouth.

If acidic substances are present in the material to which my mixture is to be added, I provide sufficient additional potassium carbonate to neutralize said substances, otherwise some of the glutamic acid may not be converted to the monopotassium salt.

The glutamic acid, sometimes referred to as $\alpha$-amino-glutamic acid, used in my composition, has a melting point of 199–206° C. and the formula $HO_2C(CH_2)_2CH(NH_2)CO_2H$. It possesses acid properties because of its free carboxyl groups. It is the most plentiful single component of the hydrolytic products of casein, amounting to 15–20%. It usually is prepared by the hydrochloric acid hydrolysis of corn or wheat glutens. The glutamic acid, which is but sparingly soluble in cold water, is precipitated as a crystalline powder. If it is desired to exclude chlorine from the diet, sulphuric acid may be used for the hydrolysis in place of the hydrochloric acid. I prefer to use rather highly purified ingredients in my preparation, therefore, I ordinarily employ glutamic acid which has been substantially freed from mother liquor hydrolyzate solids.

Another embodiment of my invention comprises a powdered soup composition which on the addition of water becomes dispersed to form a broth, said composition comprising a thickening agent, seasoning, glutamic acid, and a carbonate of potassium in an amount sufficient to supply substantially one atom of potassium for each molecule of said acid.

A further embodiment of my invention relates to a substantially sodium-free powdered soup composition containing glutamic acid and a carbonate of potassium as a substitute for sodium chloride, said carbonate being present in an amount sufficient to supply substantially one atom of potassium for each atom of said acid.

In its secondary aspect, my invention relates to bouillon or soup preparations, supplied to the public in powdered form, and containing my glutamic acid-carbonate mixture. Soups made from concentrated bases of this type possess the flavor and appearance of soups made from animal materials, even though said bases are made wholly from vegetable substances. Such concentrated soup bases may be made free from sodium salts, since my composition is an effective substitute for the table salt ordinarily found in such preparations. Thus my composition serves a double purpose, namely, it acts as a meat flavoring agent and may be used as a substitute for salt.

In order to enable those skilled in the art of seasoning and food preparation and manufacture to fully understand the nature of my invention, the following examples are given of the manner in which my novel compositions may be made and used. It should be understood, however, that the proportions of the various ingredients, the manipulative details, and the nature of the products obtained may be varied within limits without departing from the spirit of my invention. Consequently, the following examples of my invention are to be taken in an illustrative, rather than in a limitative sense, the scope of my invention being coextensive with the scope of this patent as defined by the appended claims.

*Example I*

An edible product suitable for seasoning and flavoring foods was prepared by intimately commingling 100.0 grams of high purity glutamic acid in finely divided particle form with 68.0 grams of potassium bicarbonate in finely divided particle form. If potassium carbonate were used instead of potassium bicarbonate, 47.0 grams should be mixed with the glutamic acid. If desired, inert salts, sugars, starches or other substances, such as vegetable gums, may be added to the mixture to change the flow or other characteristics thereof, or to decrease the concentration of active components per unit weight or volume.

*Example II*

An appetizing, palatable substitute for beef tea was prepared by dissolving 2 teaspoonful of the glutamic acid-carbonate mixture described under Example I in a quart of hot water. The tea thus prepared stimulates the appetite and is particularly suitable for individuals who are restricted to sodium-free diets.

When prepared dry soup concentrates are prepared from my composition, thickening agents ordinarily are employed. The thickening agents ordinarily comprise powdered edible starches or gums, alone or in combination; gelatin may be used when there is no objection to the use of an animal product. Seasoning materials such as pepper and spices usually are included to enhance the savor, and coloring matters are added to impart the desired appearance to the soup or broth.

*Example III*

A substantially sodium-free powdered soup concentrate having a beef flavor when dispersed in water was made without meat or meat extracts in accordance with the following recipe:

| | Parts by weight |
|---|---|
| Glutamic acid | 100 |
| Potassium bicarbonate | 68 |
| Ground black pepper | 0.6 |
| Edible locust bean gum | 5 |
| Amaranth (certified food color) | 0.1 |
| Tartrazne (certified food color) | 0.1 |
| Brilliant blue (certified food color) | 0.01 |

Soup made from this preparation simulated ordinary beef soup both in taste and appearance. The inclusion of 5 parts by weight of edible gelatin in the foregoing recipe makes a nutritious variation thereof.

*Example IV*

A substantially sodium-free soup powder with a chicken flavor was made by mixing the following ingredients in the dry state:

| | Parts by weight |
|---|---|
| Glutamic acid | 100 |
| Potassium bicarbonate | 68 |
| Ground black pepper | 0.8 |
| Ground celery seed | 1.7 |
| Edible locust bean gum | 6 |
| Turmeric | 0.6 |

A somewhat similar salt-free powdered chicken soup preparation, but which contained dehydrated chicken as an additional flavoring ingredient, was made by combining dehydrated government inspected chicken, glutamic acid, potassium bicarbonate and hydrolyzed plant protein with artificial seasoning, hydrogenated shortening, dextrose, dextrin, dehydrated onions, parsley, tumeric, and minor amounts of other seasonings and spices.

I have found that potassium bicarbonate and potassium carbonate unexpectedly act differently when in admixture with glutamic acid, particularly when the mixture is composited, for example, with the ingredients of a dry soup mix. In one case, a dry soup preparation containing potassium bicarbonate and powdered glutamic acid was sealed in a metal container. Within 24 hours, swelling of the can was noted. The container was punctured and the gas that escaped was collected, analyzed, and found to be carbon dioxide. When the potassium bicarbonate was replaced by a stoichiometric amount of potassium carbonate, no pressure was generated in the container. Swelling was found to occur with mixes that contained as little as 6% potassium bicarbonate as well as with those that contained 30%. In both cases, replacement of the bicarbonate by an equivalent amount of the carbonate resulted in mixes that exhibited no puffing. For this reason, I prefer to use potassium carbonate in combination with glutamic acid when the mixture is to be stored or marketed in gas-tight containers. Potassium bicarbonate is suitable for use in mixes packed in gas-permeable containers.

From the foregoing it will be apparent that I have invented improved compositions, prepared from glutamic acid and a carbonate of potassium, that can be used with great advantage as flavoring and seasoning materials, particularly in foods that must be substantially free from sodium or meat products. In addition, I have shown a number of dry soup preparations that contain my glutamic acid-carbonate mixture, said preparations being readily dispersed in hot water and yielding nourishing, palatable broths, soups, and bouillons, which may be made to simulate in appearance, consistency, and flavor, a wide variety of soups, both meat and vegetable, prepared in the usual manner. More than this, I have shown that certain of my compositions may be packaged in gas-tight containers whereas other of my compositions should be packed in gas-permeable containers.

I claim as my invention:

1. A composition in dry form capable of yielding monopotassium glutamate in the presence of water, comprising glutamic acid and a carbonate of potassium in an amount sufficient to supply substantially one atom of potassium for each molecule of said acid.

2. The composition of claim 1 further characterized in that said carbonate of potassium comprises $K_2CO_3$.

3. The composition of claim 1 further characterized in that said carbonate of potassium comprises $KHCO_3$.

4. A substantially sodium-free non-hygroscopic flavoring preparation comprising glutamic acid in particle form and a carbonate of potassium in particle form, the amount of said carbonate being sufficient to provide approximately one atom of potassium for each 2 carboxyl hydrogen atoms of said acid.

FRANK J. CAHN.

REFERENCES CITED

The following references are of record in the file of this patent:

FOREIGN PATENTS

| Number | Country | Date |
|---|---|---|
| 268,181 | Great Britain | Mar. 31, 1927 |
| 312,088 | Great Britain | May 8, 1930 |
| 352,673 | Great Britain | July 16, 1931 |

OTHER REFERENCES

"The Chemical Senses," Moncrieff, Leonard Hill Limited, 17 Stratford Place, W. 1, London, 1944, page 237.

Certificate of Correction

Patent No. 2,500,919                                                   March 21, 1950

FRANK J. CAHN

It is hereby certified that errors appear in the printed specification of the above numbered patent requiring correction as follows:

Column 2, line 43, for "α-amino-glutamic" read *α-amino-glutaric*; column 5, lines 8 and 9, for "fiavoring" read *flavoring*;

and that the said Letters Patent should be read with these corrections therein that the same may conform to the record of the case in the Patent Office.

Signed and sealed this 11th day of July, A. D. 1950.

[SEAL]

THOMAS F. MURPHY,
                                                              *Assistant Commissioner of Patents.*